United States Patent
Kim et al.

(10) Patent No.: US 8,159,583 B2
(45) Date of Patent: Apr. 17, 2012

(54) CORRELATED DOUBLE SAMPLING UNIT IN IMAGE SENSOR WITH ATTENUATION OF PARASITIC VOLTAGE LOSS

(75) Inventors: Soo-Youn Kim, Seongnam-si (KR); Kyung-Min Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 12/322,279

(22) Filed: Jan. 30, 2009

(65) Prior Publication Data
US 2009/0201403 A1 Aug. 13, 2009

(30) Foreign Application Priority Data
Jan. 30, 2008 (KR) .................... 10-2008-0009389

(51) Int. Cl.
*H04N 5/335* (2011.01)

(52) U.S. Cl. .............. 348/302; 348/241; 348/294

(58) Field of Classification Search ............ 348/241
See application file for complete search history.

(56) References Cited

U.S. PATENT DOCUMENTS

| | | | |
|---|---|---|---|
| 7,075,474 B2 | 7/2006 | Yamagata et al. | 341/169 |
| 2005/0168601 A1 | 8/2005 | Lim | |
| 2005/0280730 A1* | 12/2005 | Lim et al. | 348/308 |
| 2008/0192126 A1* | 8/2008 | Purcell et al. | 348/222.1 |

OTHER PUBLICATIONS

Korean Patent Publication No. 1020050078898 to Lim, having Publication date of Aug. 8, 2005 (w/ English Abstract page).
Korean Patent Publication No. 1020060033124 to Keel et al., having Publication date of Apr. 19, 2006 (w/ English Abstract page).
Japanese Patent Publication No. 2006-020172 to Seiji, having Publication date of Jan. 19, 2006 (w/ English Abstract page).

* cited by examiner

*Primary Examiner* — Sinh Tran
*Assistant Examiner* — Paul Berardesca
(74) *Attorney, Agent, or Firm* — Monica H. Choi

(57) ABSTRACT

A correlated double sampling unit in an image sensor includes a first capacitor, a second capacitor, and a capacitor switch. The first capacitor is coupled between a first node and an input node of a tripping unit. The second capacitor is coupled between the first node and a second node having a ramp signal switched thereon. The capacitor switch is coupled between the second node and the input node of the tripping unit for coupling the first and second capacitors in parallel as a final pixel signal is developed at the input node of the tripping unit for minimizing signal loss from a parasitic capacitance at the input node of the tripping unit.

20 Claims, 12 Drawing Sheets

(a)

(b)

(c)

(d)

(e)

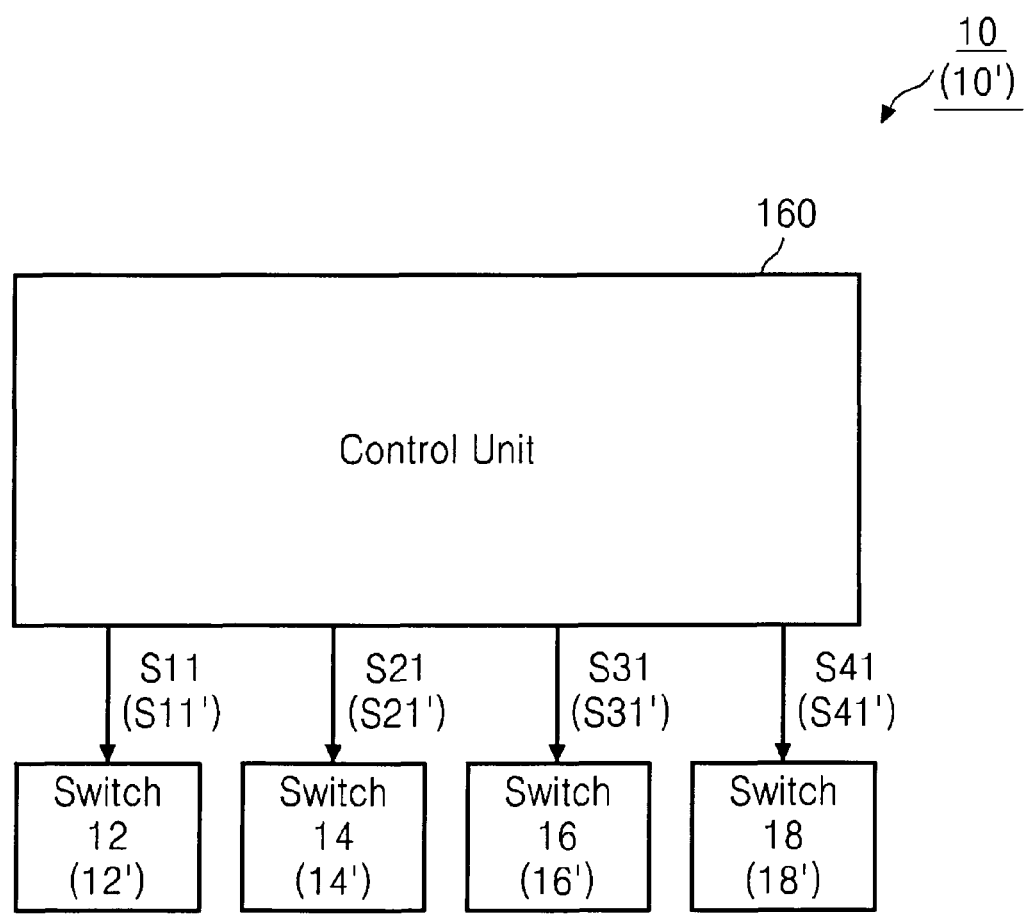

CORRELATED DOUBLE SAMPLING UNIT IN IMAGE SENSOR WITH ATTENUATION OF PARASITIC VOLTAGE LOSS

This application claims priority under 35 USC §119 to Korean Patent Application No. 10-2008-0009389, filed on Jan. 30, 2008 in the Korean Intellectual Property Office, the disclosure of which is incorporated herein in its entirety by reference.

BACKGROUND OF THE INVENTION

1. Field of the Invention

The present invention relates generally to image sensors, and more particularly, to a correlated double sampling (CDS) unit providing attenuation of voltage loss from parasitic capacitance in an image sensor.

2. Background of the Invention

Image sensors are used to produce still images or video images. An image sensor may be implemented as a charge coupled device (CCD) type or a complimentary metal oxide semiconductor (CMOS) type. The image sensor includes a plurality of pixels arranged in rows and columns of a 2-dimenstional array or matrix. Each of the pixels outputs a respective reset signal and a respective image signal when selected by a row selection signal. The image sensor includes several hundreds of thousands to several millions of pixels to produce a high resolution image.

The image sensor includes an analog-to-digital converter (ADC) that performs correlated double sampling (CDS) based on the reset signal and the image signal to generate a digital image signal. The ADC may perform correlated double sampling of a signal output from the pixel array using a single CDS circuit. Alternatively, a respective CDS circuit is formed for each column of the pixel array.

With correlated double sampling, a fixed pattern noise or low frequency noise is removed so that a signal to noise (S/N) ratio may be improved. However, parasitic capacitance within the CDS circuit may cause distortion in the output signal and may reduce the S/N ratio of the image sensor.

SUMMARY OF THE INVENTION

Accordingly, a correlated double sampling (CDS) unit of embodiments of the present invention provides attenuation of voltage loss from parasitic capacitance therein.

An image sensor according to an aspect of the present invention includes a pixel array including a plurality of pixels and a correlated double sampling unit. Each pixel generates a pixel signal including a reset signal and an image signal.

The correlated double sampling unit according to an embodiment of the present invention includes a first capacitor, a second capacitor, and a capacitor switch. The first capacitor is coupled between a first node and an input node of a tripping unit. The second capacitor is coupled between the first node and a second node having a ramp signal switched thereon. The capacitor switch is coupled between the second node and the input node of the tripping unit for coupling the first and second capacitors in parallel as a final pixel signal is developed at the input node of the tripping unit.

In an example embodiment of the present invention, the final pixel signal includes a difference between an image signal and a reset signal. For example, the final pixel signal includes a voltage difference between an image voltage and a reset voltage.

In another embodiment of the present invention, the correlated double sampling unit further includes a pixel input switch, a ramp input switch, and a tripping switch. The pixel input switch is coupled to the first node and is turned on for applying a pixel signal from a pixel on the first node. The ramp input switch is coupled to the second node and is turned on for applying a ramp signal on the second node. The tripping switch is coupled between the input node of the tripping unit and an output node of the tripping unit and is turned on for resetting the tripping unit.

In a further embodiment of the present invention, the correlated double sampling unit also includes a control unit for generating control signals to the capacitor switch, the pixel input switch, the ramp input switch, and the tripping switch.

The control unit controls the capacitor switch, the pixel input switch, the ramp input switch, and the tripping switch to be opened during an initial time period. The control unit controls the capacitor switch, the pixel input switch, and the tripping switch to be closed while the ramp input switch is opened, during a reset signal sampling period after the initial time period.

In addition, the control unit controls the capacitor switch to be closed while the pixel input switch, the ramp input switch, and the tripping switch are opened, during a holding period after the reset signal sampling period. Furthermore, the control unit controls the pixel input switch and the capacitor switch to be closed while the ramp input switch and the tripping switch are opened, during a first image signal sampling period after the reset signal sampling period.

Also, the control unit controls the pixel input switch and the ramp input switch to be closed while the capacitor switch and the tripping switch are opened, during a second image signal sampling period after the first image signal sampling period. Additionally, the control unit controls the ramp input switch to be closed while the pixel input switch, the capacitor switch, and the tripping switch are opened, during a ramping period after the second image signal sampling period.

In an example embodiment of the present invention, the pixel signal is a reset signal during the reset signal sampling period. In addition, the pixel signal is an image signal during the first and second image signal sampling periods. The ramp signal is applied on the second node during the second image signal sampling period and the ramping period. The ramp signal is maintained constant before the ramping period and begins to ramp during the ramping period.

In a further embodiment of the present invention, the tripping unit is an inverter. Alternatively, the tripping unit is a comparator having a reference signal applied on another input node of the comparator.

In this manner, the first and second capacitors are coupled together in parallel to reduce signal loss at the input node of the tripping unit from a parasitic capacitance at the input node of the tripping unit. Thus, the timing of the output signal of the tripping unit is not distorted for more accurate correlated double sampling.

BRIEF DESCRIPTION OF THE DRAWINGS

The above and other features and advantages of the present invention will become more apparent when described in detailed exemplary embodiments thereof with reference to the attached drawings in which:

FIG. 11 shows a block diagram further including a control unit for generating switch control signals in the CDS unit of FIG. 3 or the CDS unit of FIG. 7, according to an embodiment of the present invention.

The figures referred to herein are drawn for clarity of illustration and are not necessarily drawn to scale. Elements having the same reference number in FIGS. 1, 2, 3, 4, 5A, 5B, 6, 7, 8, 9, 10, and 11 refer to elements having similar structure and/or function.

DETAILED DESCRIPTION OF THE INVENTION

Figure 1:
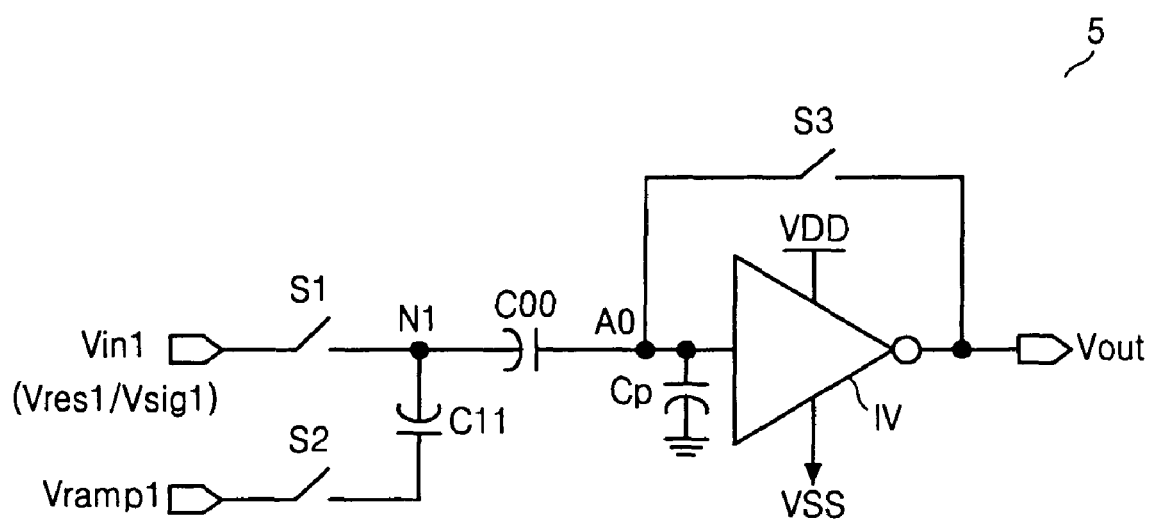
FIG. 1 is a circuit diagram of a correlated double sampling (CDS) circuit according to a comparative example of the present invention.

The present invention is now described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
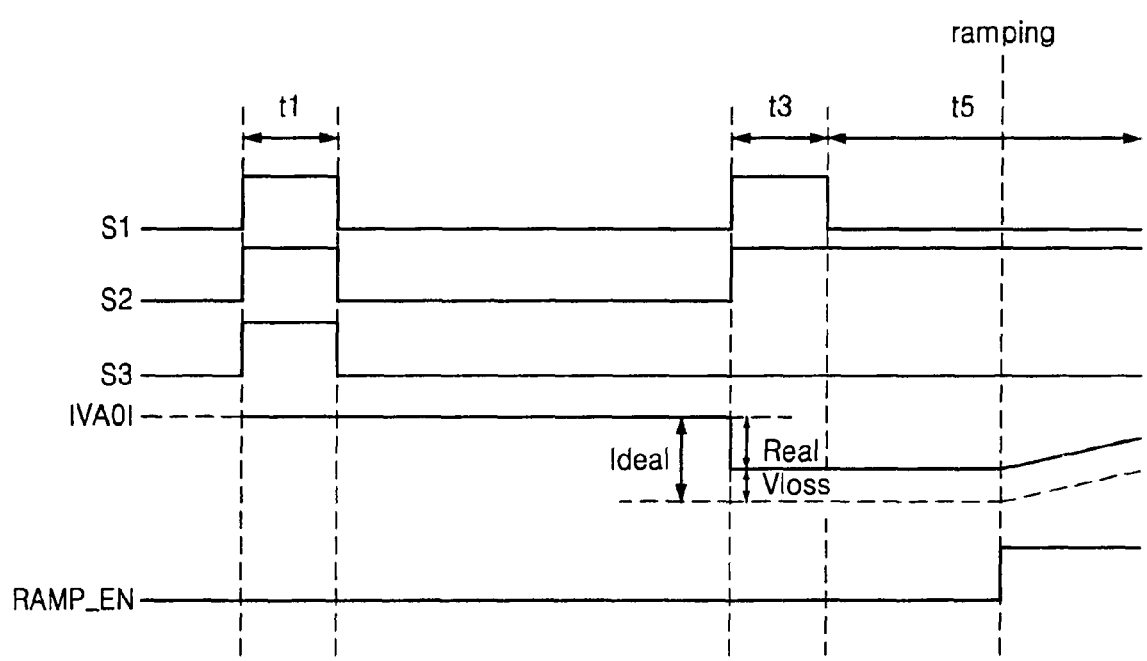
FIG. 2 shows a timing diagram of signals during operation of the CDS circuit of FIG. 1.

FIG. 1 is a circuit diagram of a CDS circuit 5 according to a comparative example of the present invention. FIG. 2 shows a timing diagram of signals during operation of the CDS circuit of FIG. 1. Referring to FIGS. 1 and 2, the CDS circuit 5 includes a first switch S1, a first capacitor C00, an inverter IV, a second switch S2, a second capacitor C11, and a third switch S3.

The first switch S1 is connected between a first node N1 and a node having a pixel signal Vin1 applied thereon. The pixel signal Vin1 includes a reset signal Vres1 and an image signal Vsig1 generated alternately in time from a pixel. The first capacitor C00 is connected between the first port N1 and an input node A0 of the inverter IV. The inverter IV inverts a voltage at the input node A0 to generate an inverted output voltage Vout.

The second switch S2 is connected between the second capacitor C11 and a node having a ramp signal Vramp applied thereon. The third switch S3 is connected between the input node A0 of the inverter IV and an output node of the inverter IV having the inverted output voltage Vout generated thereon.

FIG. 2 shows control signals for controlling the switches S1, S2, and S3. When any such control signal is activated to the logical high state, the corresponding switch is turned on (i.e., closed). When such control signal is deactivated to the logical low state, the corresponding switch is turned off (i.e., opened).

Referring to FIGS. 1 and 2, during a reset signal sampling time period t1, the first, second, and third switches S1, S2, and S3 are turned on such that the first capacitor C00 is charged to a voltage corresponding to a difference between the inverted output voltage Vout and the reset signal Vres1. Subsequently during an image signal sampling time period t3, the first and second switches S1 and S2 are turned on, the third switch S3 is turned off, and the image signal Vsig1 is input to the first capacitor C00. Accordingly, a voltage corresponding to a difference between the reset signal Vres1 and the image signal Vsig1 is generated at the input node A0 of the inverter IV.

Thereafter during a pre-ramping time period t5, the second switch S2 is turned on while the first and third switches S1 and S3 are turned off. When a ramp enable signal RAMP-EN for enabling a ramp signal generator (not shown) is activated, the ramp signal Vramp1 begins to ramp up. Accordingly, the voltage at the input node A0 of the inverter IV increases as the ramp voltage Vramp1 increases.

The inverter IV outputs either a first power voltage VDD (i.e., a logic high state) or a second power voltage VSS (i.e., a logic low state) as the inverted output voltage Vout depending on the voltage at the input port A0. Ideally, the pixel signal Vin1 from the pixel including a difference between the reset and image signals (Vres1−Vsig1) is desired to be fully transferred to the input node A0 of the inverter IV via the first capacitor C00.

However, the voltage at the input port A0 of the inverter IV is adversely affected by a parasitic capacitor Cp at the input node A0 as expressed by Equation 1 below:

$$|VA0| = Vin \times C00'/(C00' + Cp') \quad \text{[Equation 1]}$$

In Equation 1 above, |VA0| is a magnitude of the voltage at the input node A0 of the inverter IV, C00' is the capacitance of the first capacitor C00, and Cp' is the capacitance of the parasitic capacitor Cp. That is, the voltage at the input port A0 of the inverter IV has a reduced magnitude because of the parasitic capacitor Cp resulting in distortion in the timing of the inverted output signal Vout of the CDS circuit 5.

For example during the image signal sampling time period t3 in FIG. 2, an "ideal" amount of change in |VA0| is not same as the "real" amount of change in |VA0| by a voltage drop Vloss resulting from the parasitic capacitor Cp.

Figure 3:
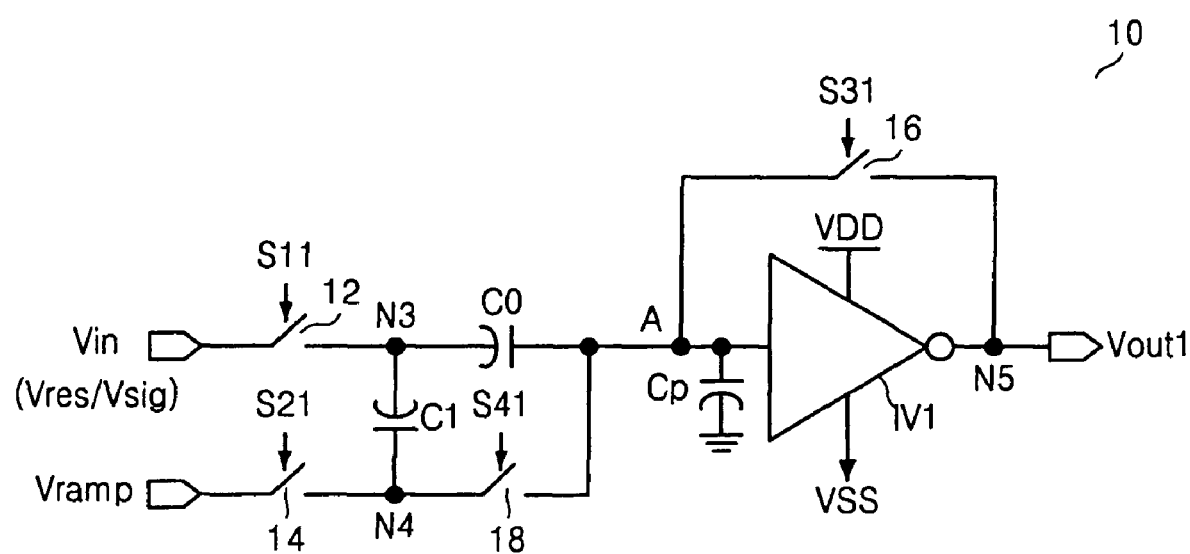
FIG. 3 is a circuit diagram of a CDS unit with an inverter according to an example embodiment of the present invention.

Accordingly, FIG. 3 shows a circuit diagram of a correlated double sampling (CDS) unit 10 for attenuating such voltage loss from the parasitic capacitor Cp, according to an embodiment of the present invention. Referring to FIG. 3, the CDS unit 10 may be implemented in an analog-to-digital converter (ADC) of an image sensor. The CDS unit 10 includes a first capacitor C0, a second capacitor C1, an inverter IV1 as an example tripping unit, a pixel input switch 12, a ramp input switch 14, a tripping switch 16, and a capacitor switch 18.

The first capacitor C0 is connected between a first node N3 and an input node A of the inverter IV1 and is charged/discharged for storing a voltage difference between the first node N3 and the input node A of the inverter IV1. The second capacitor C1 is connected between the first node N3 and a second node N4 and is charged/discharged for storing a voltage difference between the first node N3 and the second node N4.

The inverter IV1 inverts the voltage at the input node A to generate an inverted output voltage Vout. The pixel input switch 12 is connected between a port (hereinafter, referred to as a "CDS input port") having a pixel signal Vin applied thereon. The pixel signal Vin1 includes a reset signal Vres1 and an image signal Vsig1 generated alternately in time from a pixel. The pixel input switch 12 connects the first node N2 and the CDS input port in response to a respective switch control signal S11.

The ramp input switch 14 is connected between the second node N4 and a port for inputting a ramp signal Vramp generated by a ramp signal generator. The ramp input switch 14 applies the ramp signal Vramp to the second node N4 when a corresponding switch control signal S21 is activated. The tripping switch 16 is connected between the input node A of the inverter IV1 and an output node N5 of the inverter IV1. The tripping switch connects the input and output nodes A and N5 of the inverter IV1 when a corresponding switch control signal S31 is activated.

The capacitor switch 18 is connected between the second node N4 and the input node A of the inverter IV1. The capacitor switch connects the second node N4 and the input node A of the inverter IV1 when a corresponding switch control signal S41 is activated. Referring to FIG. 11, the CDS unit 10 further includes a control unit 160 for generating the switch control signals S11, S21, S31, and S41 in FIG. 3.

Figure 4:
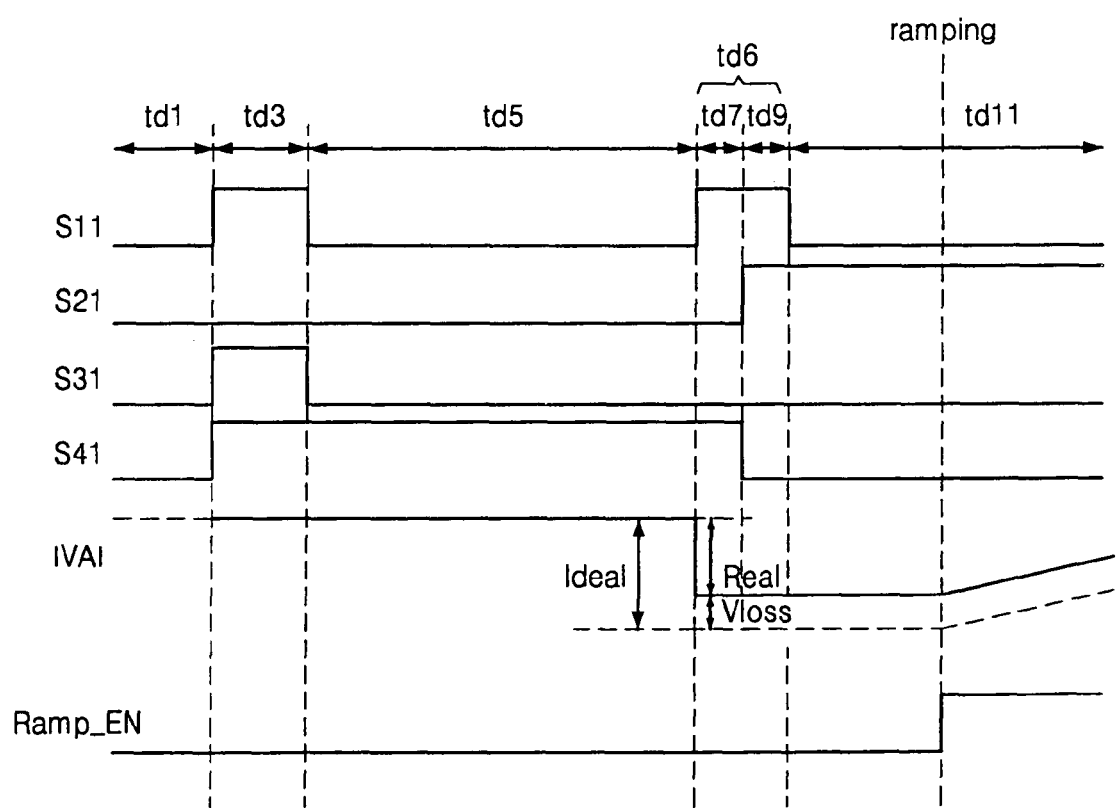
FIG. 4 shows a timing diagram of signals during operation of the CDS unit of FIG. 3, according to an example embodiment of the present invention.
Figure 5A:
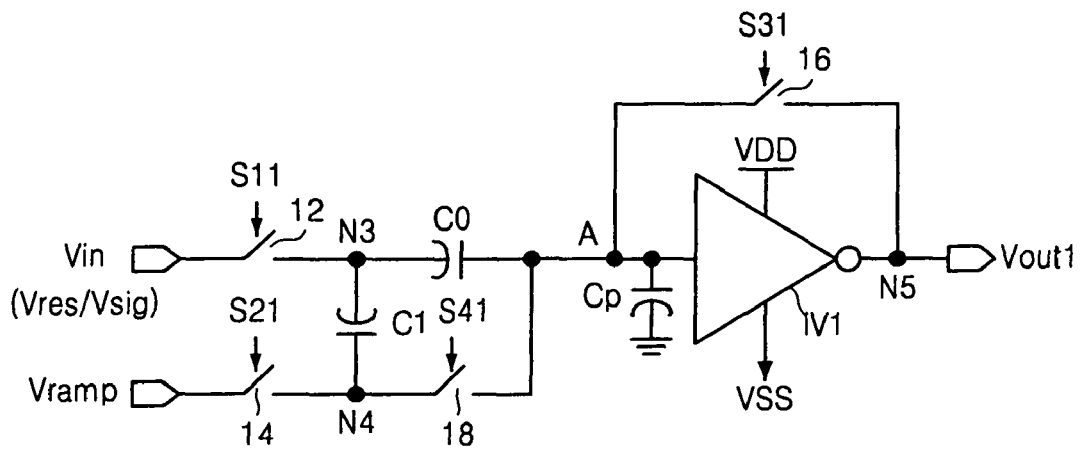
FIGS. 5A and 5B with portions (a), (b), (c), (d), and (e) show configurations of switches in the CDS unit of FIG. 3 during sequential time periods, according to an example embodiment of the present invention.
Figure 5A:
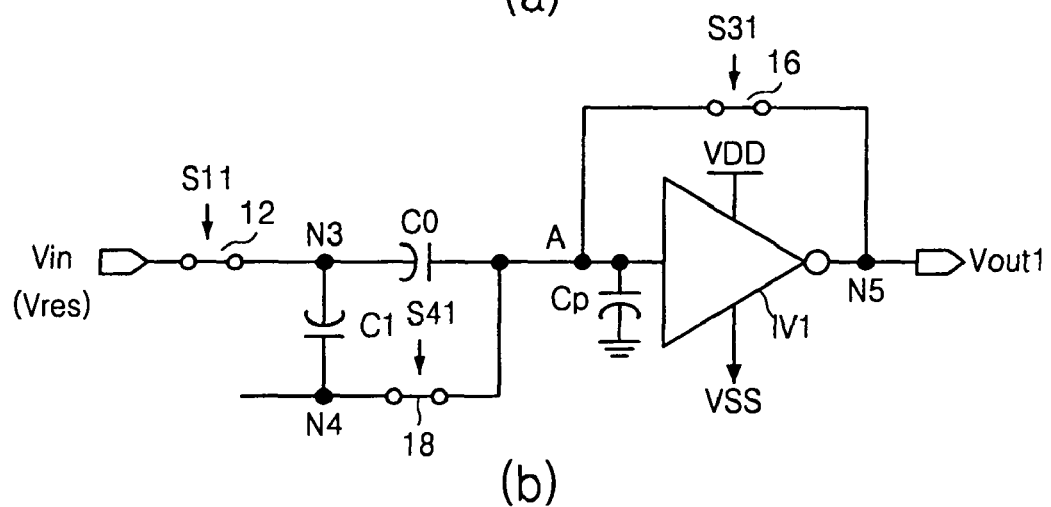
Figure 5A:
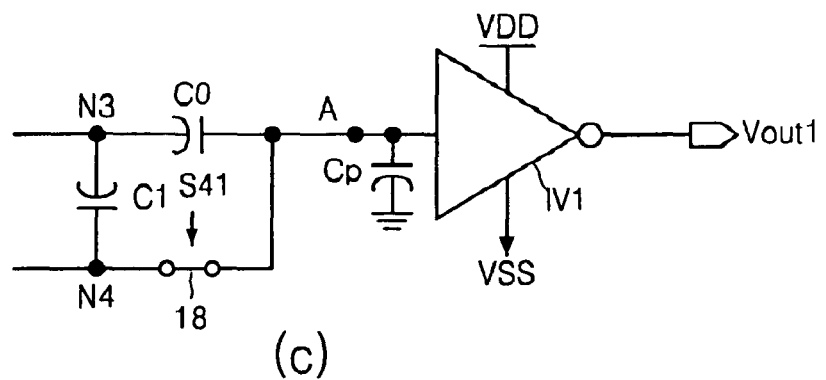
Figure 5B:
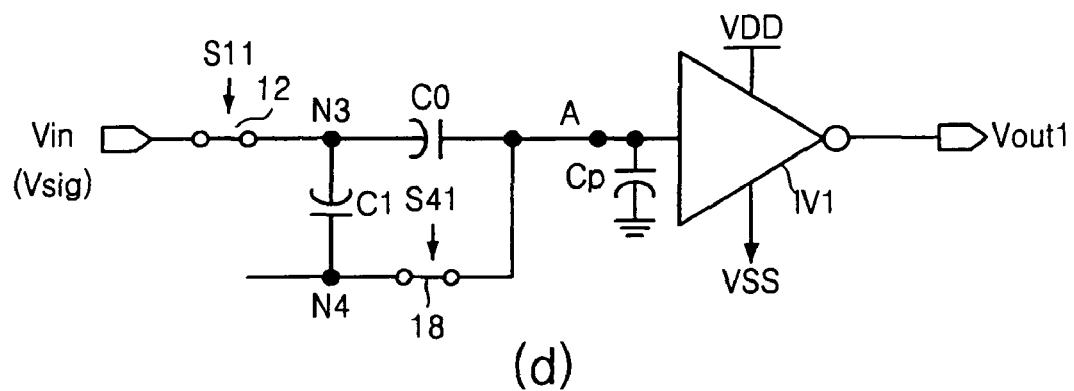
Figure 5B:
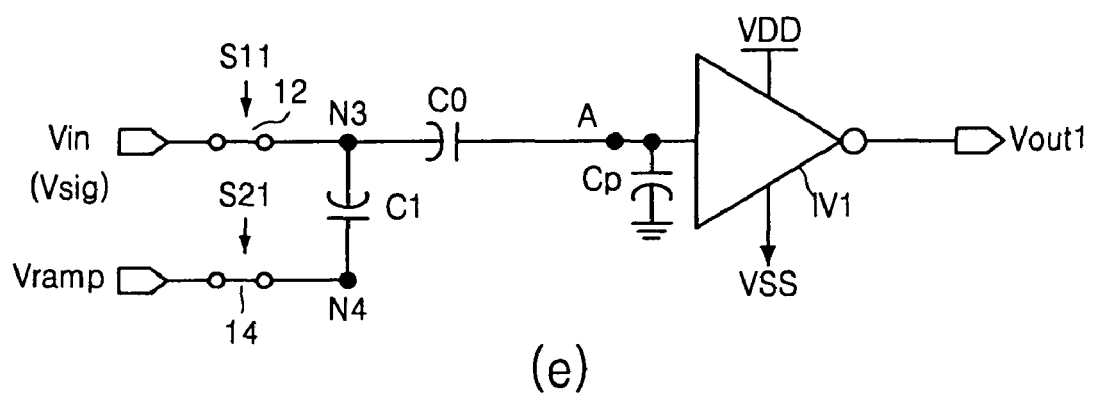
Figure 9:
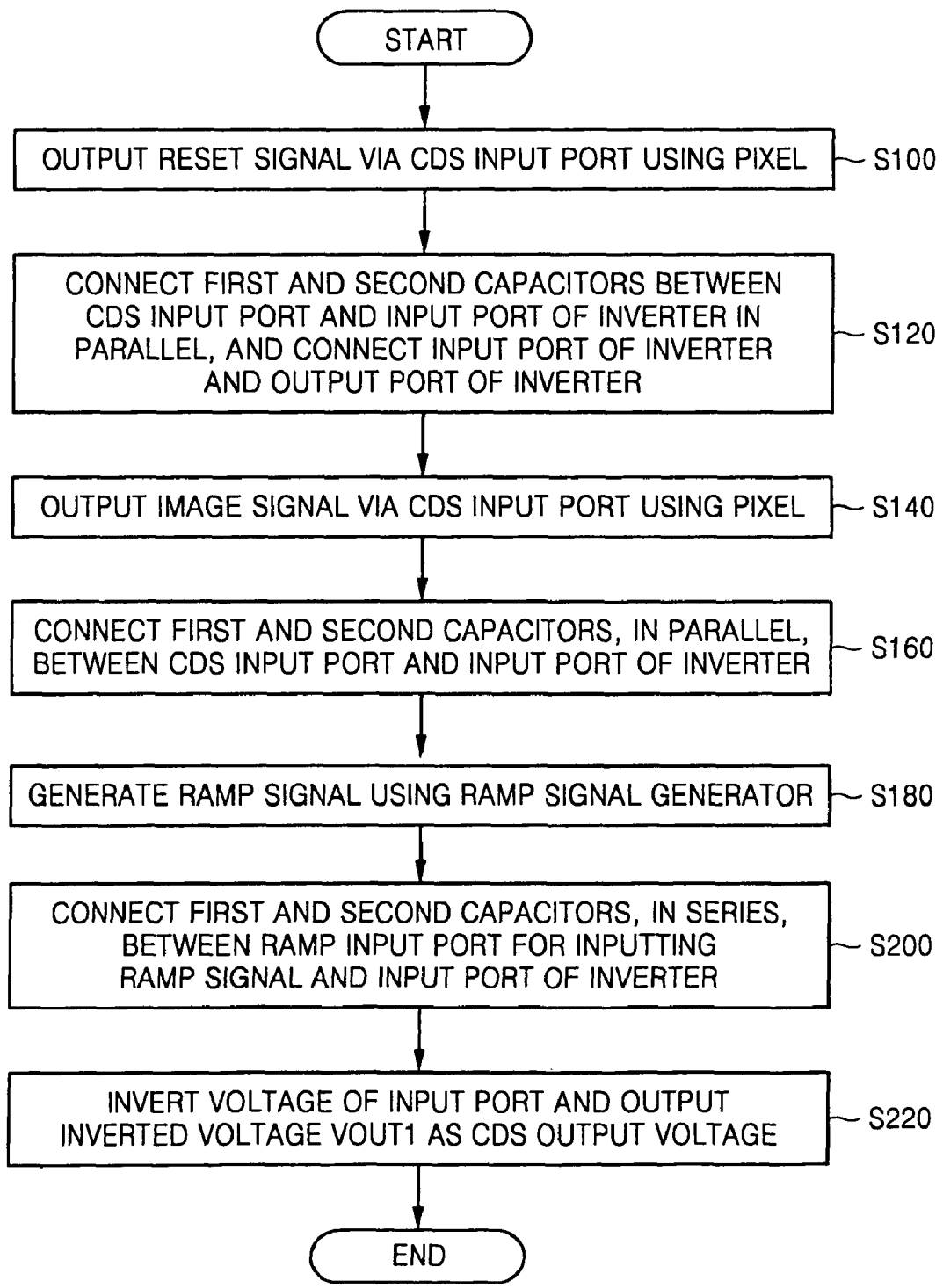
FIG. 9 is a flowchart of steps during operation of the CDS unit of FIG. 3, according to an embodiment of the present invention.

FIG. 4 shows a timing diagram of signals during operation of the CDS unit 10 of FIG. 3, according to an embodiment of the present invention. The control unit 160 generates the switch control signals S11, S21, S31, and S41 as illustrated in FIG. 4. FIG. 9 shows a flow-chart of steps during operation of the CDS unit 10 of FIG. 3, according to an embodiment of the present invention. FIGS. 5A and 5B with portions (a), (b), (c), (d), and (e) show configurations of the switches S11, S21, S31, and S41 in the CDS unit 10 of FIG. 3 during sequential time periods, according to an example embodiment of the present invention;

Referring to FIGS. 3, 4, and 5A (a), during an initial time period td1, the pixel input switch 12, the ramp input switch 14, the tripping switch 16, and the capacitor switch 18 are all turned off. Subsequently during a reset signal sampling time period td3 as shown in FIG. 5A (b), the pixel input switch 12, the tripping switch S31, and the capacitor switch 18 are turned on while the ramp input switch 14 is turned off, so that the first and second capacitors C0 and C1 sample the reset signal Vres generated as Vin from the pixel (step S100 of FIG. 9).

In this manner during the reset signal sampling time period td3, the input node A and the output node N5 of the inverter IV1 are connected together, and the first and second capacitors C0 and C1 are connected in parallel between the first node N3 and the input node A of the inverter IV1 (step S120 of FIG. 9). Such capacitors C0 and C1 charge to a voltage corresponding to a difference between an output voltage Vout1 of the inverter IV1 and the reset signal Vres.

Thereafter during a holding time period td5 as shown in FIG. 5A (c), the pixel input switch 12, the ramp input switch 14, and the tripping switch 16 are turned off while the capacitor switch 18 remains turned on. Accordingly during the holding time period td5, the voltage corresponding to the difference between the output voltage Vout1 of the inverter IV1 and the reset signal Vres is maintained by the capacitors C0 and C1.

During an image signal sampling time period td6, the pixel outputs the image signal Vsig corresponding to a brightness level of received light as Vin (step S140 of FIG. 9). The image signal sampling step td6 includes a first image signal sampling time period td7 corresponding to FIG. 5B (d) and a second image signal sampling time period td9 corresponding to FIG. 5B (e).

During the first image signal sampling time period td7 as shown in FIG. 5B (d), the pixel input switch 12 and the capacitor switch 18 are turned on while the ramp input switch 14 and the tripping switch 16 are turned off. Accordingly, the first and second capacitors C0 and C1 are connected in parallel to sample the image signal Vsig generated from the pixel (step S160 of FIG. 9). In detail, the first and second capacitors C0 and C1 are charged to a final pixel voltage signal including a voltage difference between the voltage charged during the holding step td5 including the reset voltage signal Vres and the image voltage signal Vsig.

The capacitor switch 18 is turned on during the reset signal sampling time period td3, the holding time period td5, and the first image signal sampling time period td7, such that the first and second capacitors C0 and C1 are connected in parallel. Accordingly, the voltage at the input node A0 of the inverter IV is expressed by the following Equation 2:

$$|VA| = Vin \times (C0' + C1')/(C0' + C1' + Cp') \quad \text{[Equation 2]}$$

In Equation 2 above, |VA| is the magnitude of the voltage at the input node A of the inverter IV1, C0' is the capacitance of the first capacitor C0, C1' is the capacitance of the second capacitor C1, and Cp' is the capacitance of the parasitic capacitor Cp at the input node A0 of the inverter IV1.

The magnitude |VA| of the voltage at the input node A of the inverter IV1 in FIG. 3 is greater than the magnitude |VA0| of the voltage at the input node A0 of the inverter IV of the CDS circuit 5 in FIG. 1 because of the parallel connection of the second capacitor C1 to the first capacitor C0 in FIG. 3.

For example in FIG. 4, an "ideal" amount of change in the magnitude |VA| of the voltage generated at the input node A of the inverter IV1 in FIG. 3 during the first image signal sampling step td7 is not same as the "real" amount of change in |VA| by a voltage drop Vloss resulting from the parasitic capacitor Cp. However, the Vloss in FIG. 4 is less than the Vloss in FIG. 2 because of the parallel connection of the second capacitor C1 to the first capacitor C0 in FIG. 3. Thus, during the reset signal sampling time period td3, the holding time period td5, and the first image signal sampling time period td7, the parallel connection of the second capacitor C1 to the first capacitor C0 in FIG. 3 attenuates the effect of the parasitic capacitor Cp at the input node A of the inverter IV1.

During the subsequent second image signal sampling time period td9 as shown in FIG. 5B (e), the pixel input switch 12 and the ramp input switch 14 are turned on while the capacitor switch 18 and the tripping switch 16 are turned off. Accordingly, the ramp signal Vramp is applied at the second node N4 (step S180 of FIG. 9), and the first and second capacitors C0 and C1 become connected in series between the input node A of the inverter IV1 and the second node N4 having the ramp signal applied thereon (step S200 of FIG. 9).

Thereafter during a ramping time period td11, while the ramp input switch 14 is turned on, the pixel input switch 12, the capacitor switch 14, and the tripping switch 18 are turned off. During the ramping time period td11, a ramp enable signal RAMP-EN is activated such that the ramp signal Vramp begins to ramp up. Accordingly, the magnitude |VA| of the voltage generated at the input node A of the inverter IV1 correspondingly begins to increase when the ramp enable signal RAMP-EN is activated.

The inverter IV1 outputs either the first power voltage VDD or the second power voltage VSS as the inverted output voltage Vout1 depending on the voltage of at the input node A of the inverter IV1 (step S220 of FIG. 9). More specifically, the inverted output voltage Vout1 begins at a first one of the first and second power voltages VDD and VSS before the ramp enable signal RAMP-EN is activated. Thereafter, the inverted output voltage Vout1 trips to the other of the first and second power voltages VDD and VSS when the voltage at the input node A of the inverter IV1 increases and reaches a tripping voltage at a tripping time point. The time period from when the ramp enable signal RAMP-EN is activated to such a tripping time point indicates the brightness of the light sensed by the pixel generating the image signal Vsig.

Figure 6:
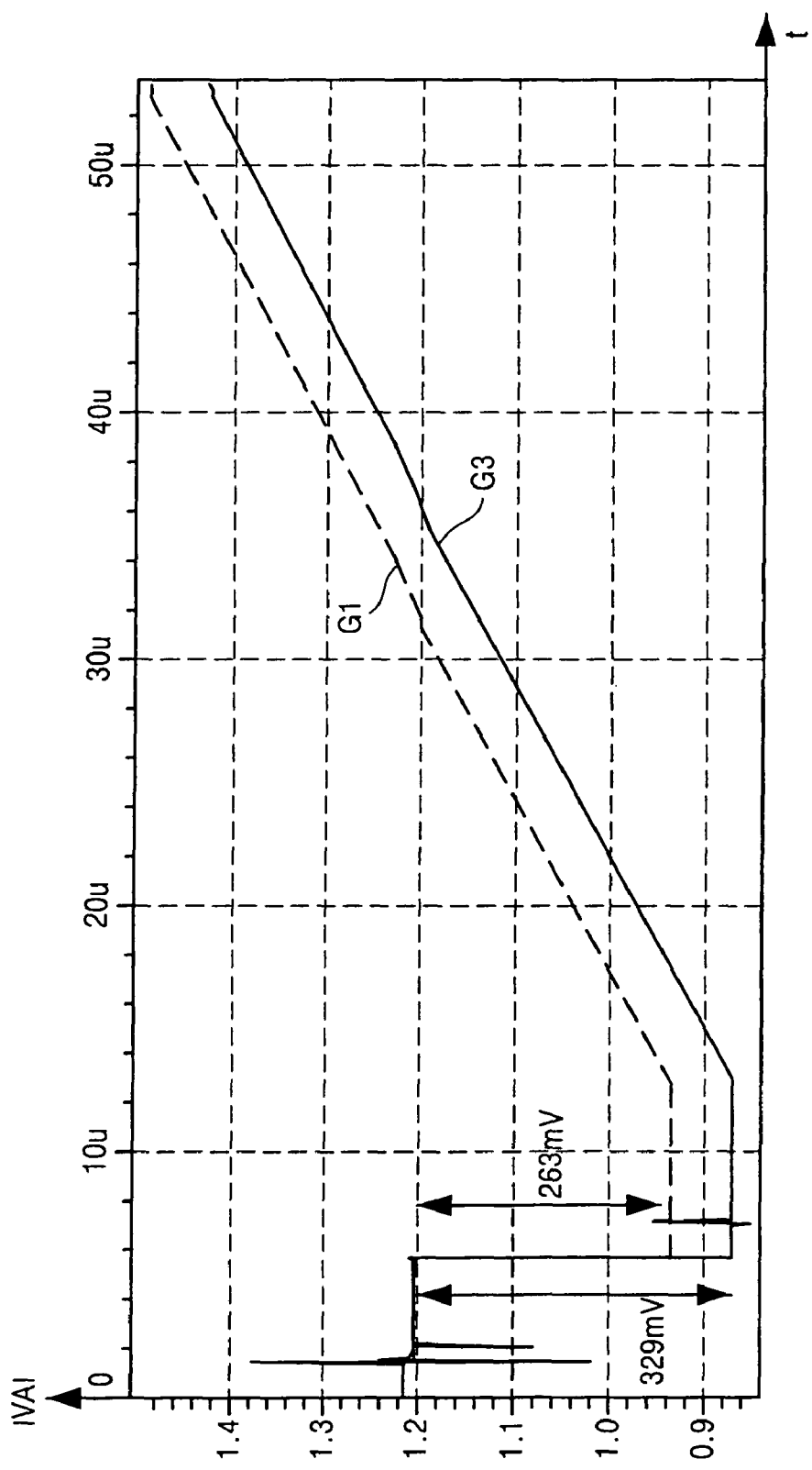
FIG. 6 shows a plot of a magnitude of voltage at an input node of a tripping unit in the CDS unit of FIG. 3, according to a simulation result in an embodiment of the present invention.

FIG. 6 shows a plot of the magnitude |VA| of the voltage generated at the input node A of the inverter IV1 in the CDS unit of FIG. 3, according to a simulation result in an embodiment of the present invention. In FIG. 6, G1 indicates a voltage $V_{A0}$ at the input node A0 of the inverter IV of FIG. 1, and G3 indicates the voltage $V_A$ at the input node A of the inverter IV1 of FIG. 3.

Assuming that the pixel signal Vin includes the reset signal Vres or the image signal Vsig of about 400 mV during the image signal sampling time periods t3 or td7, the voltage $V_{A0}$ at the input node A0 of the inverter IV of FIG. 1 is about 263 mV, but the voltage $V_A$ at the input port A of the inverter IV1 of FIG. 3 is about 329 mV. Thus, the CDS unit 10 of FIG. 3 results in a lower voltage drop of the voltage $V_A$ at the input node A of the inverter IV1 resulting from the parasitic capacitor Cp. As a result, the output of the CDS unit 10 more accurately reflects the intensity of light measured by the pixel with increased signal-to-noise ratio (SNR).

Figure 7:
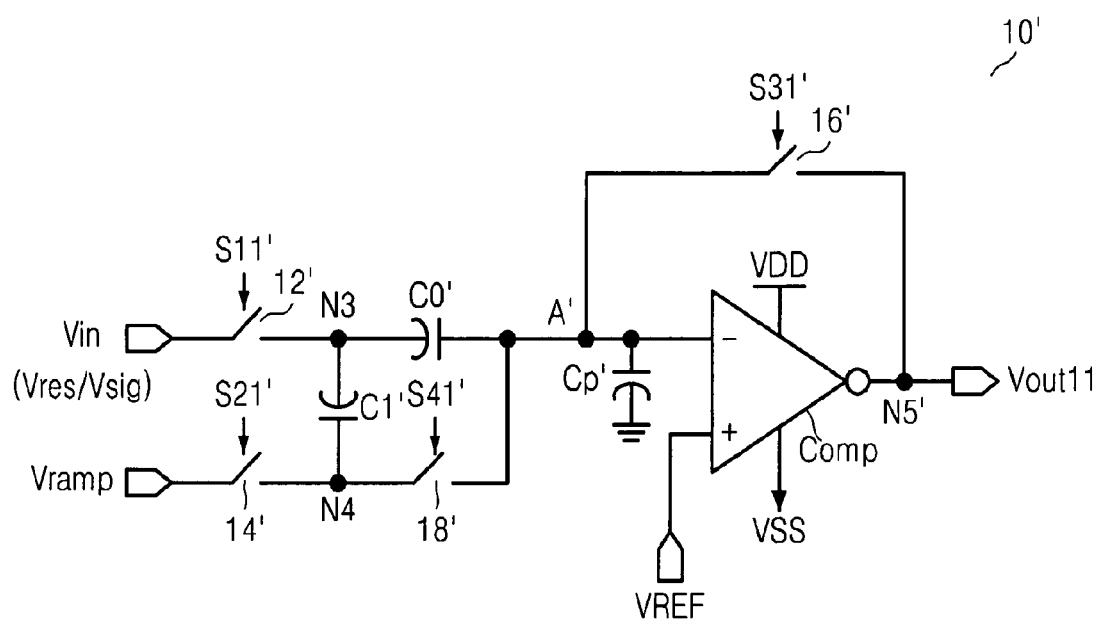
FIG. 7 is a circuit diagram of a CDS unit with a comparator according to another example embodiment of the present invention.

FIG. 7 shows a circuit diagram of a CDS unit 10' according to an alternative embodiment of the present invention. Referring to FIG. 7, the CDS unit 10' includes a first capacitor C0', a second capacitor C1', a comparator Comp that is an alternative example tripping unit, a pixel input switch 12', a ramp input switch 14', a tripping switch 16', and a capacitor switch 18'.

That is, the CDS unit 10' of FIG. 7 includes the comparator Comp instead of the inverter IV1 of the CDS circuit 10 of FIG. 3. The comparator Comp compares a voltage at a first input node A' with a reference voltage VREF applied at a second input node. More specifically, an output voltage Vout11 generated at the output of the comparator Comp begins at one of the first and second power voltages VDD and VSS before the ramp enable signal RAMP-EN is activated.

Thereafter, the output voltage Vout11 of the comparator Comp trips to the other of the first and second power voltages VDD and VSS when the voltage at the input node A' of the comparator Comp increases and reaches a tripping voltage at a tripping time point. The time period from when the ramp enable signal RAMP-EN is activated to such a tripping time point indicates the brightness of the light sensed by the pixel generating the image signal Vsig.

Figure 10:
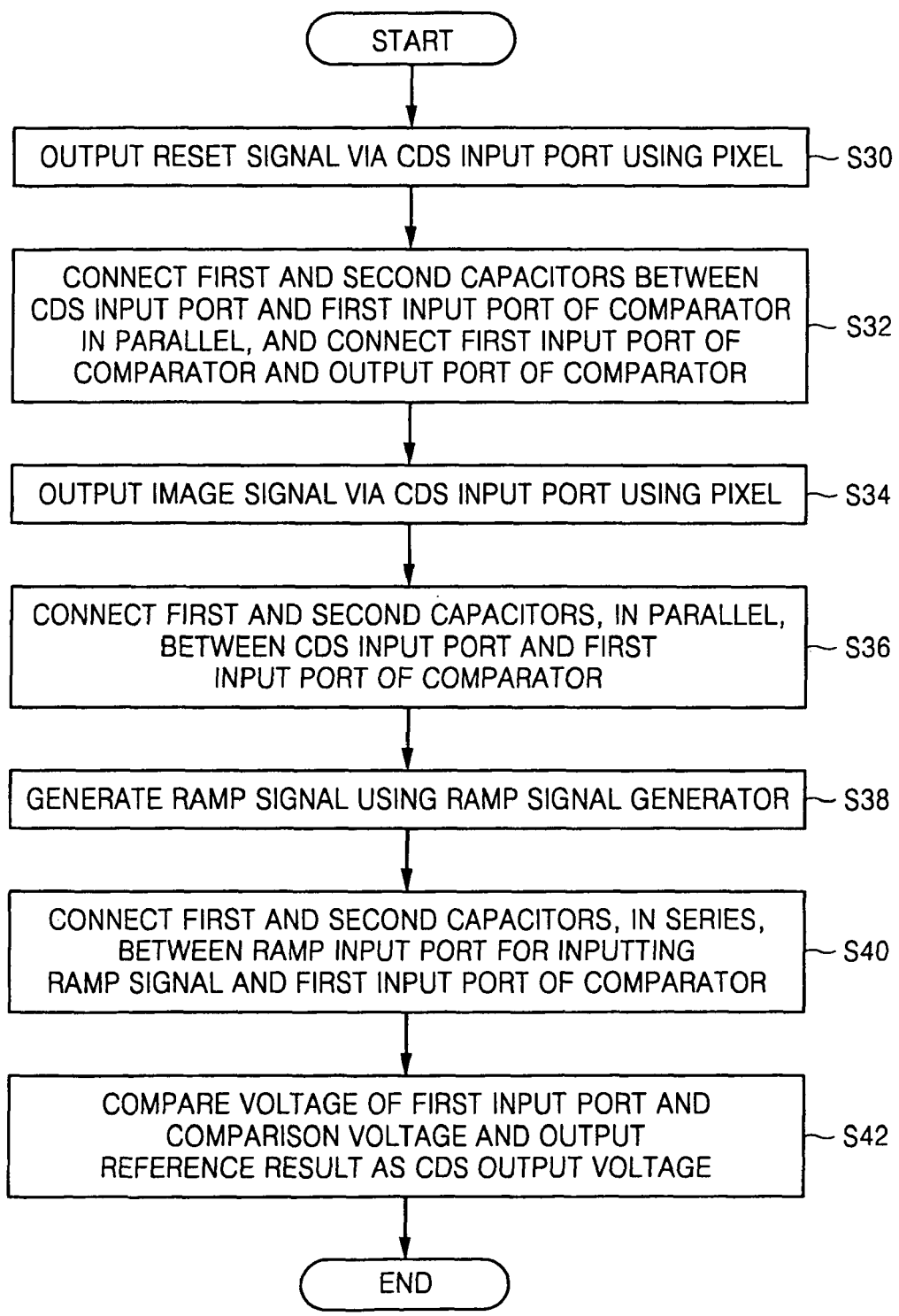
FIG. 10 is a flowchart of steps during operation of the CDS unit of FIG. 7, according to an embodiment of the present invention.

Otherwise, the first capacitor C0', the second capacitor C1', and the switches 12', 14', 16', and 18' in FIG. 7 operate similarly as the first capacitor C0, the second capacitor C1, and the switches 12, 14, 16, and 18, respectively, of FIG. 3. Thus, detailed descriptions thereof are omitted herein. FIG. 10 is a flowchart of steps during operation of the CDS unit 10' of FIG. 7, according to an alternative embodiment of the present invention. However, steps S30, S32, S34, S36, S38, S40, and S42 of FIG. 10 are similar to the steps S100, S120, S140, S160, S180, S200, and S220, respectively, of FIG. 9. Thus, detailed descriptions thereof are omitted herein.

Similar to Equation 2 above for the CDS unit 10 of FIG. 3, the magnitude |VA'| of the voltage generated at the first input node A' of the comparator Comp in the CDS unit 10' of FIG. 7 is expressed by the following Equation 3:

$$|VA'| = Vin \times (C0'' + C1'') / (C0'' + C1'' + Cp'') \quad \text{[Equation 3]}$$

In Equation 3 above, C0" is the capacitance of the first capacitor C0', C1" is the capacitance of the second capacitor C1', and Cp" is the capacitance of the parasitic capacitor Cp' at the first input node A' of the comparator Comp in FIG. 7.

Thus, during the reset signal sampling time period, the holding time period, and the image signal sampling time period, the first and second capacitors C0' and C1' are connected in parallel. Accordingly, the voltage drop at the input node A' of the comparator Comp from the parasitic capacitor Cp' thereon is minimized.

Figure 8:
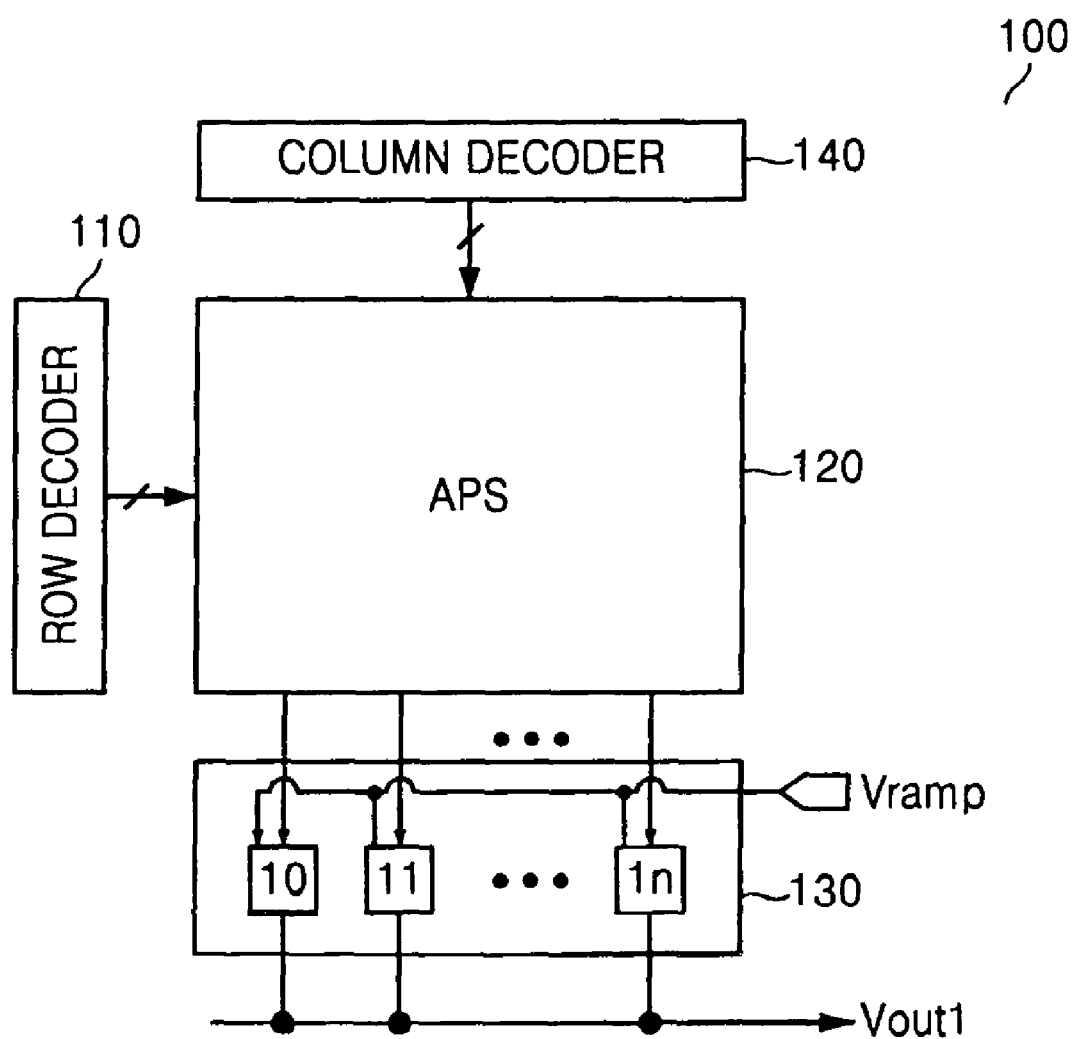
FIG. 8 is a block diagram of an image sensor with the CDS unit of FIG. 3 or 7, according to an embodiment of the present invention.

FIG. 8 shows a block diagram of an image sensor 100 including the CDS unit 10 of FIG. 3 or the CDS unit 10' of FIG. 7, according to an embodiment of the present invention. The image sensor 100 includes a row decoder 110, a pixel array 120, a CDS block 130, and a column decoder 140. The row decoder 110 receives a row address (not shown) and outputs a row selection signal (not shown) for selecting one of row lines (not shown) to be activated in the pixel array 120. The column decoder 140 receives a column address (not shown) and outputs a column selection signal (not shown) for selecting one of column lines (not shown) in the pixel array 120.

The pixel array 120 includes a plurality of pixels (not shown) arranged in rows and columns in a two-dimensional matrix form. Each of the pixels outputs a respective signal Vin that is generated alternately in time as the reset signal Vres and the image signal Vsig when selected by the row selection signal and the column selection signal.

The CDS block (or an analog-to-digital block) 130 receives the respective reset signal Vres and the respective image signal Vsig from each of the pixels and performs the correlated double sampling (CDS). The CDS block 130 includes a plurality of CDS units 10, 11, ..., and 1n, each implemented similarly as the CDS unit 10 of FIG. 3 or the CDS unit 10' of FIG. 7 for processing the respective reset and image signals Vres and Vsig generated from a corresponding pixel in the pixel array 120.

While the present invention has been particularly shown and described with reference to exemplary embodiments thereof, it will be understood by those of ordinary skill in the art that various changes in forms and details may be made therein without departing from the spirit and scope of the present invention as defined by the following claims.

What is claimed is:

1. A correlated double sampling unit comprising:
   a first capacitor coupled between a first node and an input node of a tripping unit;
   a second capacitor coupled between the first node and a second node having a ramp signal switched thereon; and
   a capacitor switch coupled between the second node and the input node of the tripping unit for coupling the first and second capacitors in parallel as a final pixel signal is developed at the input node of the tripping unit,
   wherein the capacitor switch is directly connected to the input node of the tripping unit,
   and wherein the first and second capacitors are directly connected to the first node without any switch coupled between the first capacitor and the first node.

2. The correlated double sampling unit of claim 1, wherein the final pixel signal includes a difference between an image signal and a reset signal.

3. The correlated double sampling unit of claim 1, wherein the final pixel signal includes a voltage difference between an image voltage and a reset voltage.

4. The correlated double sampling unit of claim 1, further comprising:
   a pixel input switch, coupled to the first node, for being turned on to apply a pixel signal from a pixel on the first node, and wherein the pixel input switch is coupled to the first node without any capacitor coupled between the pixel input switch and the first node; and
   a ramp input switch, coupled to the second node, for being turned on to apply a ramp signal on the second node.

5. The correlated double sampling unit of claim 4, further comprising:
   a tripping switch, coupled between the input node of the tripping unit and an output node of the tripping unit, for being turned on to reset the tripping unit.

6. The correlated double sampling unit of claim 5, further comprising:
   a control unit for generating control signals to the capacitor switch, the pixel input switch, the ramp input switch, and the tripping switch.

7. A correlated double sampling unit comprising:
   a first capacitor coupled between a first node and an input node of a tripping unit;
   a second capacitor coupled between the first node and a second node having a ramp signal switched thereon;
   a capacitor switch coupled between the second node and the input node of the tripping unit for coupling the first and second capacitors in parallel as a final pixel signal is developed at the input node of the tripping unit;
   a pixel input switch, coupled to the first node, for being turned on to apply a pixel signal from a pixel on the first node;
   a ramp input switch, coupled to the second node, for being turned on to apply a ramp signal on the second node;
   a tripping switch, coupled between the input node of the tripping unit and an output node of the tripping unit, for being turned on to reset the tripping unit; and
   a control unit for generating control signals to the capacitor switch, the pixel input switch, the ramp input switch, and the tripping switch;
   wherein the control unit controls the capacitor switch, the pixel input switch, the ramp input switch, and the tripping switch to be opened during an initial time period;
   and wherein the control unit controls the capacitor switch, the pixel input switch, and the tripping switch to be closed while the ramp input switch is opened, during a reset signal sampling period after the initial time period;
   and wherein the control unit controls the capacitor switch to be closed while the pixel input switch, the ramp input switch, and the tripping switch are opened, during a holding period after the reset signal sampling period;
   and wherein the control unit controls the pixel input switch and the capacitor switch to be closed while the ramp input switch and the tripping switch are opened, during a first image signal sampling period after the reset signal sampling period;
   and wherein the control unit controls the pixel input switch and the ramp input switch to be closed while the capacitor switch and the tripping switch are opened, during a second image signal sampling period after the first image signal sampling period;
   and wherein the control unit controls the ramp input switch to be closed while the pixel input switch, the capacitor switch, and the tripping switch are opened, during a ramping period after the second image signal sampling period.

8. The correlated double sampling unit of claim 7, wherein the pixel signal is a reset signal during the reset signal sampling period, and wherein the pixel signal is an image signal during the first and second image signal sampling periods, and wherein the ramp signal is applied on the second node during the second image signal sampling period and the ramping period, and wherein the ramp signal is maintained constant before the ramping period and begins to ramp during the ramping period.

9. The correlated double sampling unit of claim 1, wherein the tripping unit is an inverter.

10. The correlated double sampling unit of claim 1, wherein the tripping unit is a comparator having a reference signal applied on another input node of the comparator.

11. An image sensor comprising:
    a pixel array including a plurality of pixels, each pixel generating a pixel signal including a reset signal and an image signal; and
    a correlated double sampling unit including:
      a first capacitor coupled between a first node and an input node of a tripping unit;
      a second capacitor coupled between the first node and a second node having a ramp signal switched thereon;
      a pixel input switch, coupled between the first node and the pixel array, for being turned on to apply the pixel signal on the first node, wherein the pixel input switch is coupled to the first node without any capacitor coupled between the pixel input switch and the first node; and
      a capacitor switch, coupled between the second node and the input node of the tripping unit, for coupling the first and second capacitors in parallel as a final pixel signal is developed at the input node of the tripping unit,
wherein the capacitor switch is directly connected to the input node of the tripping unit.

12. The image sensor of claim 11, wherein the final pixel signal includes a difference between the image signal and the reset signal.

13. The image sensor of claim 11, wherein the final pixel signal includes a voltage difference between an image voltage of the image signal and a reset voltage of the reset signal.

14. The image sensor of claim 11, wherein the correlated double sampling unit further includes:
a ramp input switch, coupled to the second node, for being turned on to apply a ramp signal on the second node.

15. The image sensor of claim 14, wherein the correlated double sampling unit further includes:
a tripping switch, coupled between the input node of the tripping unit and an output node of the tripping unit, for being turned on to reset the tripping unit.

16. The image sensor of claim 15, further comprising:
a control unit for generating control signals to the capacitor switch, the pixel input switch, the ramp input switch, and the tripping switch.

17. The image sensor of claim 16, wherein the control unit controls the capacitor switch, the pixel input switch, the ramp input switch, and the tripping switch to be opened during an initial time period;
and wherein the control unit controls the capacitor switch, the pixel input switch, and the tripping switch to be closed while the ramp input switch is opened, during a reset signal sampling period after the initial time period;
and wherein the control unit controls the capacitor switch to be closed while the pixel input switch, the ramp input switch, and the tripping switch are opened, during a holding period after the reset signal sampling period;
and wherein the control unit controls the pixel input switch and the capacitor switch to be closed while the ramp input switch and the tripping switch are opened, during a first image signal sampling period after the reset signal sampling period;
and wherein the control unit controls the pixel input switch and the ramp input switch to be closed while the capacitor switch and the tripping switch are opened, during a second image signal sampling period after the first image signal sampling period;
and wherein the control unit controls the ramp input switch to be closed while the pixel input switch, the capacitor switch, and the tripping switch are opened, during a ramping period after the second image signal sampling period.

18. The image sensor of claim 17, wherein the pixel signal is the reset signal during the reset signal sampling period, and wherein the pixel signal is the image signal during the first and second image signal sampling periods, and wherein the ramp signal is applied on the second node during the second image signal sampling period and the ramping period, and wherein the ramp signal is maintained constant before the ramping period and begins to ramp during the ramping period.

19. The image sensor of claim 11, wherein the tripping unit is an inverter.

20. The image sensor of claim 11, wherein the tripping unit is a comparator having a reference signal applied on another input node of the comparator.

* * * * *